UNITED STATES PATENT OFFICE.

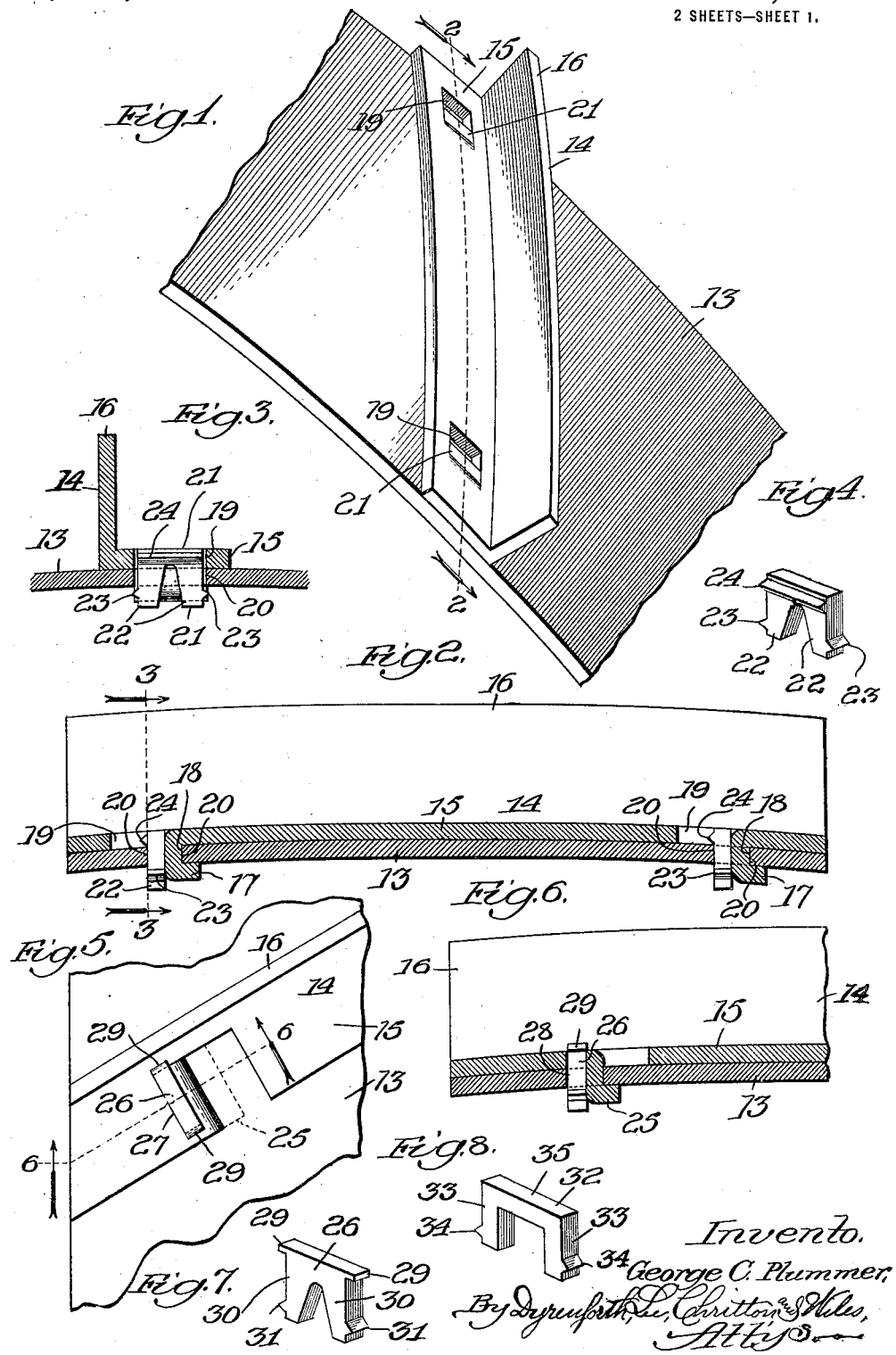

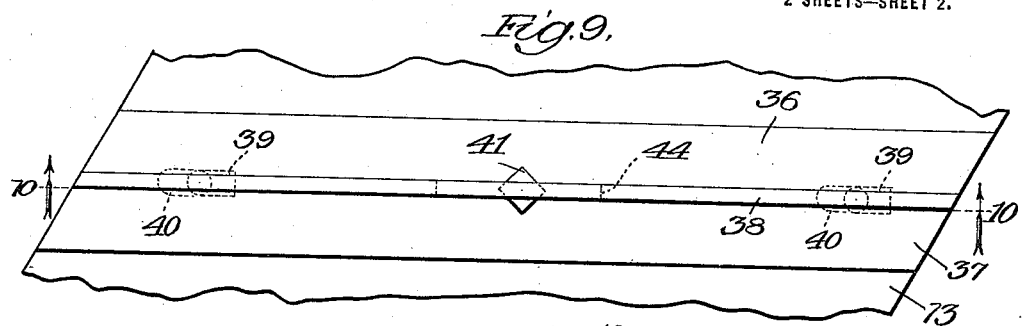
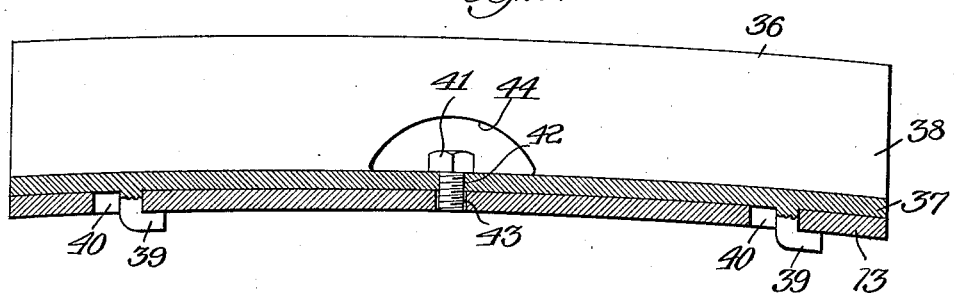
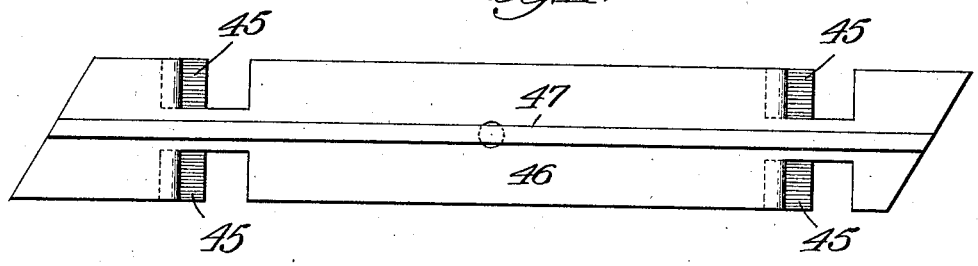
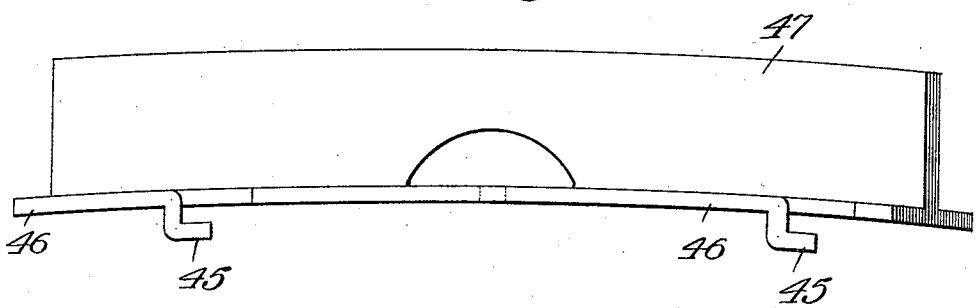

GEORGE C. PLUMMER, OF CHICAGO, ILLINOIS, ASSIGNOR TO THOMAS J. HRUBY, OF CICERO, ILLINOIS.

LUG-EQUIPPED TRACTION-WHEEL.

1,394,685.          Specification of Letters Patent.      Patented Oct. 25, 1921.

Application filed September 13, 1919. Serial No. 323,531.

*To all whom it may concern:*

Be it known that I, GEORGE C. PLUMMER, a citizen of the United States, residing at 3502 Lake Park avenue, Chicago, in the county of Cook and State of Illinois, have invented a new and useful Improvement in Lug-Equipped Traction-Wheels, of which the following is a specification.

My invention relates to wheels, as for example for tractors, equipped with lugs arranged at intervals about their peripheries to enhance the tractive effect of the wheels; and my primary object is to provide by a novel, simple and economical construction, for the ready and secure fastening of lugs in place on the wheel rim and their quick detachment therefrom.

Referring to the accompanying drawings, Figure 1 is a perspective view of a portion of a rim of a tractor wheel equipped with a lug, the structure as shown constituting one of the embodiments of my invention. Fig. 2 is an enlarged section taken at the line 2—2 on Fig. 1, and viewed in the direction of the arrows. Fig. 3 is a section taken at the line 3—3 on Fig. 2, and viewed in the direction of the arrows. Fig. 4 is a perspective view of one of the keys employed for holding the lug in position on the wheel rim. Fig. 5 is a broken face view of the rim of a wheel illustrating another embodiment of my invention. Fig. 6 is a section taken at the line 6—6 on Fig. 5, and viewed in the direction of the arrows. Fig. 7 is a perspective view of the key employed in the construction shown in Figs. 5 and 6. Fig. 8 is a similar view of another form of key which may be employed. Fig. 9 is a view like Fig. 5 of still another embodiment of the invention. Fig. 10 is a section taken at the line 10—10 on Fig. 9, and viewed in the direction of the arrows. Fig. 11 is a plan view of another embodiment of the invention; and Fig. 12, a side view of the structure shown in Fig. 11.

Referring more particularly to the construction shown in Figs. 1 to 4 inclusive, a section of the rim of a wheel is represented at 13, and one of the lugs for enhancing the tractive effect thereof at 14, it being understood that these lugs may be provided in any desired number about the periphery of the wheel. In the form shown, the lug 14 is formed of angle iron providing a base 15 at which it fits against the outer periphery of the rim 13 and a radially extending flange 16, the lug being shown as extending obliquely to the axis of the wheel. In the particular construction shown in the figures just referred to, the lug 14 is formed of metal adapting it to be bent, and toward opposite ends ears represented at 17 are struck from the metal of the base 15 into the form shown affording the undercut portions 18 and presenting the apertures 19. In this arrangement the rim 13 of the wheel would be provided with series of openings 20 of such size that the ears 17 may be passed therethrough in positioning the lug on the rim, the lug then being shifted lengthwise to cause walls of the openings 20 to extend into the undercut, or recessed portions 18 of the ears, thereby locking the lug 14 against movement radially of the wheel. As a means for locking the lug 14 in the position referred to and shown in Fig. 2, I provide the keys represented at 21, these keys being preferably formed of spring steel, presenting the resilient leg portions 22 provided on their outer faces with ribs 23, the keys 21 also having ribs 24. The keys are so constructed that they may enter the openings 19, and upon flexing the leg portions 22 together, may be passed downwardly through the openings 20 to the position shown in Fig. 2 wherein the ribs 23 extend into interlocking position relative to the inner surface of the rim 13, and the ribs 24 in interlocking position relative to the outer surface of the rim 13, thereby preventing these keys from being accidentally displaced from a position in which they hold the lug 14 against shifting to disengage the ears 17 from the rim 13. The lug 14, however, may be removed by flexing the leg portions 22 toward each other and removing the keys from the openings 20.

In the construction shown in Figs. 5 and 6, the ears represented at 25 and which correspond with the ears 17 are cut from the metal reversely to that illustrated in Fig. 2, the locking key therefor and represented at 26, passing downwardly through an opening 27 in the base 15 of the lug 14, and through the opening 28 in the rim 13 through which the lug 25 was introduced to the position shown in Fig. 6, it being understood that to engage the ears 25, there being one of these ears at each end of the lug, with the rim 13, the lug is shifted lengthwise as explained of the construction in Fig. 1. The key 26 is provided at opposite ends with shoulders 29 at which it rests upon the upper surface of the base 15 and its leg portions represented at 30, and which are flexible as explained of the keys 21, are provided with ribs 31 which become interlocked with the rim 13 as shown when these keys are applied to position.

In Fig. 8, I have shown another form of key which may be employed, this key being represented at 32 and generally in the form of a yoke, presenting the flexible arms 33 with ribs 34 corresponding with the ribs 31. In the use of this key, the legs 33 would extend through spaced openings in the base 15 and an opening in the rim 13, and the cross-piece 35 of the key would bear against the upper surface of the base 15 between the spaced openings therein, the lugs 34 extending into interlocked relation to the inner surface of the rim 13.

In accordance with the showing of Figs. 9 and 10, the lug therein illustrated and represented at 36, the rim of the wheel being also designated 13, is provided with a different construction of device for holding the lug after it has been applied to the rim and shifted into interlocking position therewith. The lug shown is of T-shape in cross section, the base being represented at 37 and its radially extending flange at 38. The ears for interlocking with the inner side of the rim 13, by introducing them through openings 40 in the rim 13, and then shifting the lug lengthwise, are represented at 39, in this construction being shown as cast on the lug. The means for fastening the lug in the position stated comprise a machine screw 41 which passes through preferably a threaded opening 42 in the base 37 of the lug midway between the sides of the latter, and extends into an opening 43, preferably unthreaded, in the rim 13, the flange 38 being recessed as indicated at 44 to permit of the location and manipulation of the screw 41 as stated.

The construction shown in Figs. 11 and 12 is the same as that of Figs. 9 and 10, except that its interlocking ears represented at 45 are provided in pairs cut from the metal of the base 46 of the lug, the radially extending flange of which is represented at 47. It will be understood that the rim of the wheel would be provided with openings so disposed as to receive the ears 45 and permit of the shifting of the lug on the rim to a position in which these ears interlock with the rim, as stated of the previously described constructions.

While I have illustrated and described certain particular embodiments of my invention, I do not wish to be understood as intending to limit it thereto, as the same may be variously further modified and altered without departing from the spirit of my invention, it being my intention to claim my invention as fully and completely as the prior state of the art will permit.

What I claim as new and desire to secure by Letters Patent is:

1. The combination of a wheel rim containing apertures, a traction lug positioned on said rim and having ears formed by deflecting the metal of said lug with the base of the lug apertured adjacent said ears, said ears being adapted to enter the apertures in said rim and interlock with the latter upon shifting said lug, and locking means extending into apertures in said lug and rim for holding the lug against shifting.

2. The combination of a wheel rim containing apertures, a traction lug positioned on said rim and having ears adapted to extend through said apertures and interlock with said rim upon shifting said lug, and a key formed of depending relatively resilient legs extending into one of the apertures in said rim, and projections on the portion of said key above said rim and on said legs below said rim extending in overlapped relation to adjacent portions of the rim when the key is positioned in place as stated for preventing accidental displacement of said key.

GEORGE C. PLUMMER.